United States Patent [19]

Johnson

[11] 4,041,514
[45] Aug. 9, 1977

[54] PHOTOGRAPHIC CAMERA HAVING EXTERNAL POWER SUPPLY

[75] Inventor: Bruce K. Johnson, Andover, Mass.

[73] Assignee: Polaroid Corporation, Cambridge, Mass.

[21] Appl. No.: 581,113

[22] Filed: May 27, 1975

[51] Int. Cl.² ............................................. G03B 17/02
[52] U.S. Cl. ..................................... 354/288; 354/83; 354/173; 354/295
[58] Field of Search .............. 354/173, 174, 275, 276, 354/288, 212, 83, 84, 85, 86, 87, 88, 295; 136/111, 166 R

[56] References Cited

U.S. PATENT DOCUMENTS

| 3,848,984 | 11/1974 | Kanno | 354/288 |
| 3,853,396 | 12/1974 | Ogiso et al. | 354/173 |

FOREIGN PATENT DOCUMENTS

| 2,330,766 | 6/1973 | Germany | 354/288 |

*Primary Examiner*—L. T. Hix
*Assistant Examiner*—Alan Mathews
*Attorney, Agent, or Firm*—Alfred E. Corrigan

[57] ABSTRACT

A camera having a recess in an exterior surface thereof and a battery assembly having mounting structure adapted to be slidably received by the recess for attaching the battery assembly to the camera to provide a source of energy for operating various components of the camera.

4 Claims, 9 Drawing Figures

PHOTOGRAPHIC CAMERA HAVING EXTERNAL POWER SUPPLY

BACKGROUND OF THE INVENTION

1. Field of the Invention

A photographic camera having means for mounting a power source to an exterior surface of the camera.

2. Description of the Prior Art

Generally, cameras of today include a battery which provides a source of energy for running various components of the camera which relate to the processing of a film unit, i.e., the steps one takes to produce an image either latent or visible, in the film unit. These components may take the form of an exposure control circuit, a flash firing circuit, motors for driving film advancing apparatus, shutter cocking and release, and in the case of cameras of the selfdeveloping or instant type apparatus for driving at least one of a pair of rollers in order to spread a processing fluid across a photosensitive element of the film unit to initiate development of a visible image in the film unit. In most instances, the battery is located within the camera and if it must be replaced because of some defect within the battery itself such as an open or shorted internal circuit or because its energy level has dropped below that required to operate any of the components of the camera, then the camera must be opened in order to replace the battery. Sometimes a problem arises when there is a supply film in the camera's film chamber at the time that the battery fails, i.e., the light-tightness of the exposure chamber is violated thereby possibly resulting in premature exposure of part or all of the film supply contained therein.

The above problem of a battery failing at an inopportune time is minimized to a degree by periodically replacing the battery every time a new film cassette containing a new battery is inserted into the camera, as taught by U.S. Pat. Nos. 3,750,551 and 2,213,768. However, since the battery is now within the cassette, failure of the battery will necessarily result in the loss of the unexposed film supply within the cassette.

It has also been proposed to provide a camera with a separate compartment for receiving batteries, the compartment being configured so as to prevent incorrect insertion of a battery into the compartment. While this teaching may solve the problem of violating the light-tightness during replacement of the batteries of the exposure chamber, the solution does not lend itself to minimizing the size of the camera; nor does it provide a solution for those cameras wherein the battery is located within the film cassette. Also, cameras having an exteriorly mounted source of energy have been described in the prior art. For example U.S. Pat. No. 3,853,396 discloses a camera having an internal battery which is coupled to a motor, and an auxiliary unit including a battery which is adapted to be attached to the camera such that the two batteries are in series. Also see German Offenlegunzsschrift No. 2,330,766 (Offenlezunzstag: 9-1-75) wherein is shown a camera having a recess in an exterior surface for receiving a generally flat battery. However, the motors of many cameras would be burned out if their source of energy were connected in series with another source of energy as taught in the U.S. patent while the latter described German publication fails to correct the aforementioned problem concerning film cassettes having a defective battery therein. Further, as regards the last mentioned disclosure, there does not appear to be any teaching thereon of configuring the battery and recess in such a way that proper insertion of the battery into the recess will be guaranteed.

SUMMARY OF THE INVENTION

The present invention relates to a photograhic camera having a recess in an exterior surface thereof which is adapted to receive a battery assembly which will provide a source of energy for operating various components of the camera; and to a battery assembly which is configured such that it will be received by the recess in the camera only when the terminals of the battery assembly are aligned to operatively engage a pair of electrical contacts in the camera. The recess is elongated and has a dove tail configuration in cross section which is adapted to cooperate with a correspondingly configured extension or mounting structure on the battery assembly to slidably guide the terminals on the battery assembly into engagement with the electrical contacts in the camera. In those instances wherein the camera houses an internal battery, e.g., a battery located within a film cassette positioned within the camera or within an interval cavity or compartment, the terminals of the battery assembly are adapted to disconnect the electrical contacts in the camera from the internally located battery while simultaneously connecting the battery of the battery assembly to the electrical contacts.

It is an object of the invention to provide a camera with the capability to receive an externally mounted battery assembly in such a manner that the terminals on the battery assembly are always correctly oriented with a pair of electrical contacts in the camera.

It is another object of the invention to provide a means whereby a battery may be releasably attached to an exterior surface of a camera so as to replace a battery located within the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
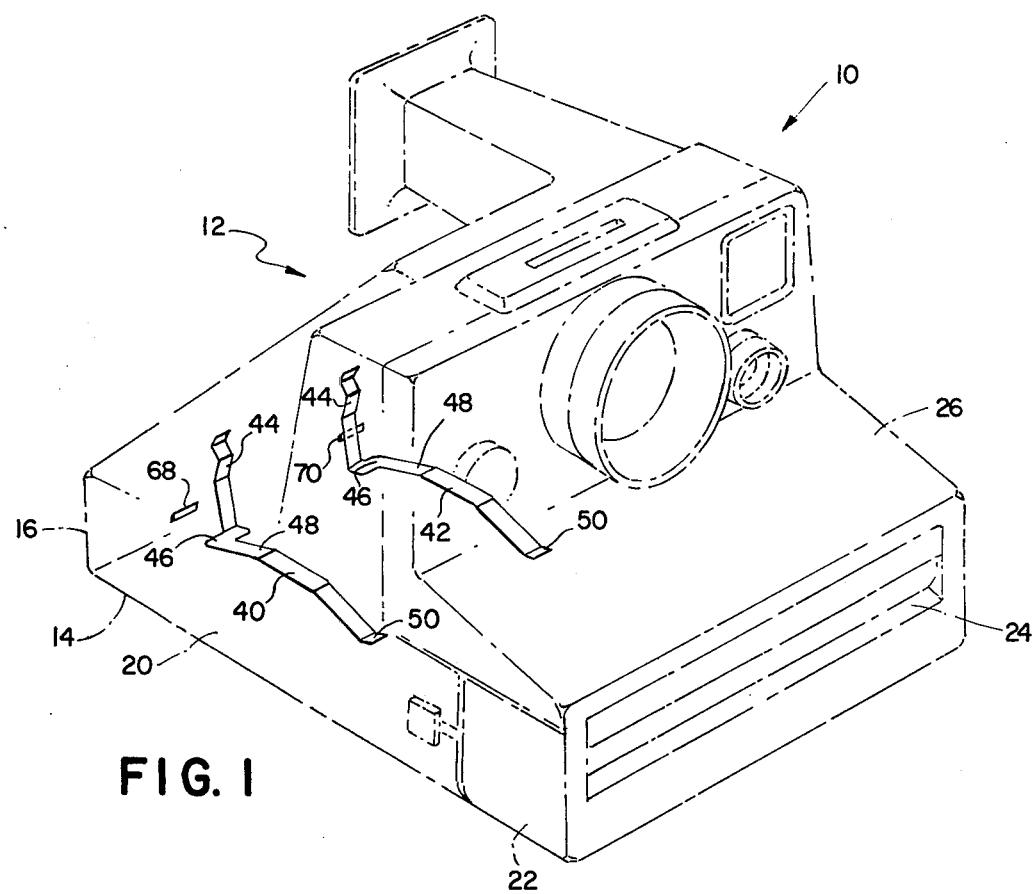
FIG. 1 is a perspective view of a photographic camera, the camera being shown in phantom in order to clearly show internal structure.
Figure 2:
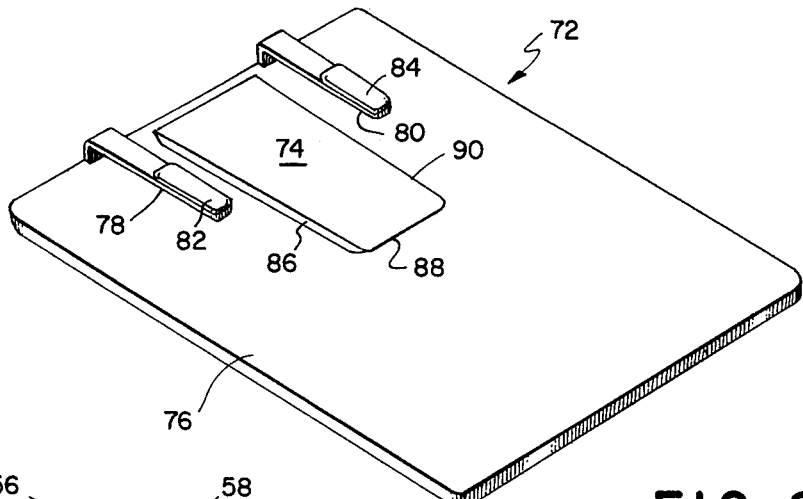
FIG. 2 is a perspective view of a battery assembly adapted for use with the camera of FIG. 1.

Reference is now made to FIG. 1 of the drawings wherein is shown a camera 10 of the type shown and described in the copending application of Andrew S. Ivester, Ser. No. 554,780 filed Mar. 3, 1975, now U.S. Pat. No. 3,994,002. The camera 10 includes a main housing 12 having a bottom wall 14, a rear wall including a vertical portion 16 and an inclined portion 18, and a pair of side walls 20 (only one of which is shown). Extending forwardly of the side walls 20 and pivotally attached thereto is a spread roller housing section 22 having an exit opening 24 through which a film unit is adapted to be advanced to the exterior of the camera. The exterior of the camera is completed by a shutter housing 26.

Walls 14, 16 and 20 define an open end chamber 28 for receiving a film cassette 30. Mounted within the cassette 30 are a plurality of film units 32, a battery 34 having a pair of terminals 36 (only one of which is shown), a platen 38 and a dark slide (not shown) for preventing premature exposure of the uppermost film unit 32. The film cassette 30 is adapted to be located within the film chamber 28 by pivoting the spread roller housing 22 in a clockwise manner (as viewed in FIG. 1) to expose the open end of the film chamber 28. The film cassette 30 is then slid into the film chamber 28 and the chamber secured by rotating the spread roller housing section 22 back to the position shown in FIG. 1.

Mounted within the film chamber 28 is a pair of electrical contacts 40 and 42. Each contact includes a generally vertical member 44, an outwardly extending portion 46 and a forwardly extending portion 48 terminating is an unattached free end 50. Each of the vertical members 44 is suitably attached to a support member 52 and has its end 54 electrically connected into an electrical circuit 56, preferably having electrically energizable means such as a motor 58 for driving motor driven processing means 60, i.e., a film advancing apparatus or a pair of rollers for spreading a processing fluid, as described above; or in the case where the processing means includes an automatic exposure control circuit or a flash circuit, each end 54 is connected to the processing means 60 by an electrically energizable circuit, such as a line running directly from contact 42 to the processing means 60. Each of the contacts 40 and 42 is resiliently biased to extend through an opening in the bottom wall of the film cassette to electrically engage one of the terminals 36 on the battery 34 thereby electrically coupling the battery 34 into the electrical circuit to provide it with a source of energy for operating various components of the processing means 60 of the camera, as is well known in the art.

Figure 4:
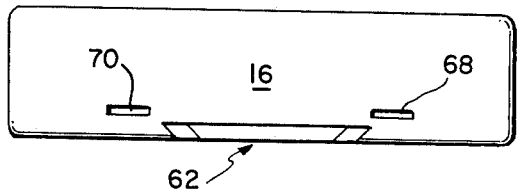
FIG. 4 is a diagrammatic rear view of a portion of the camera shown in FIG. 1.

From the foregoing it can be seen that the chances of having a battery failure have been substantially reduced by automatically replacing the battery everytime a new film cassette is loaded into the camera. However, if the condition of the battery in the cassette becomes such that it is unable to perform its function, provision must be made to provide a substitute therefor in order to process the entire supply of film within the cassette; and this substitution should take place without prematurely exposing any of the film units within the film cassette. Accordingly, the instant invention includes providing the camera with means for attaching an external battery to the camera in a manner which removes the battery 34 from the electrical circuit 56. Specifically, the bottom wall 14 of the camera 10 is provided with an elongated tapered recess 62 having an open end 64 in end wall 16, a closed end 66 and a dove tail cross sectional configuration as measured in a plane perpendicular to the longitudinal axis of the recess, as shown in FIG. 4. Rear wall 16 also includes a pair of openings 68 and 70 having suitable means (not shown) for preventing the passage of any light therethrough which would be actinic to the film units. As can be seen in FIG. 1, openings 68 and 70 are located in alignment with the forwardly extending portions 48 of the electrical contacts 40 and 42 but out of alignment with the vertical portions 44.

The recess 62 is adapted to slidably receive a battery assembly 72 having a correspondingly shaped attachment plate 74 extending from a generally flat thin battery 76. The battery 76 includes a pair of terminals 78 and 80 extending upwardly therefrom and then forwardly in the direction of the taper of the attachment plate 74. Mounted on top of each of the battery terminals is a strip of nonconducting material 82 and 84, the purpose of which will be shortly explained. The plate 74 includes side surfaces 86, 88 and 90 which are inwardly tapered to conform with the configuration of the recess 62.

Figure 9:
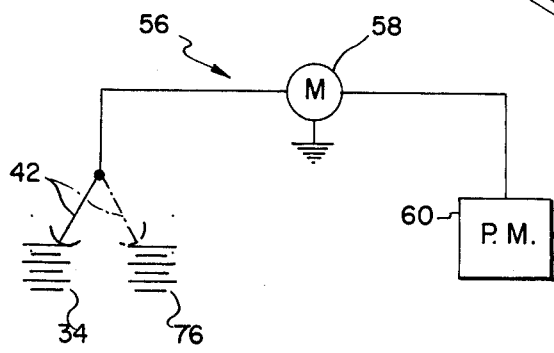
FIG. 9 is a diagrammatic showing of the instant invention.

Whenever the battery 34 in the film cassette fails and there is still a supply of film units left within the cassette 30, one merely attaches the battery assembly 72 to the camera 10 by slidably inserting the attachment plate 74 into the recess 62. During this insertion, the terminals 78 and 80 are guided through the openings 68 and 70 respectively, through a pair of laterally spaced openings 92 (only one shown) in wall 52 and then into engagement with the contacts 40 and 42 to move them out of electrical engagement with the battery terminals 36, thereby disconnecting the battery 34 from the circuit 56 and connecting the external battery 76 into the circuit. This substitution of the battery 76 for the battery 34 is depicted by the dotted line position of contact 42 in FIG. 9. Nonconducting strips 82 and 84 which are on the side of the battery terminals 78 and 80 closest to the terminals 36 of battery 34 insure that the internal battery 34 is removed from the circuit whenever the battery assembly 72 is operatively coupled to the camera. The battery 76 may now be used to supply the power for completing the processing of the remaining film units. It should be noted that the configuration of the recess 62 and the attachment plate 74 is such that the recess will only receive the attachment plate 74 when battery terminals 78 and 80 will operatively engage contacts 40 and 42, respectively, thereby insuring the proper electrical connection therebetween, i.e., positive-to-positive and negative-to-negative.

Figure 3:
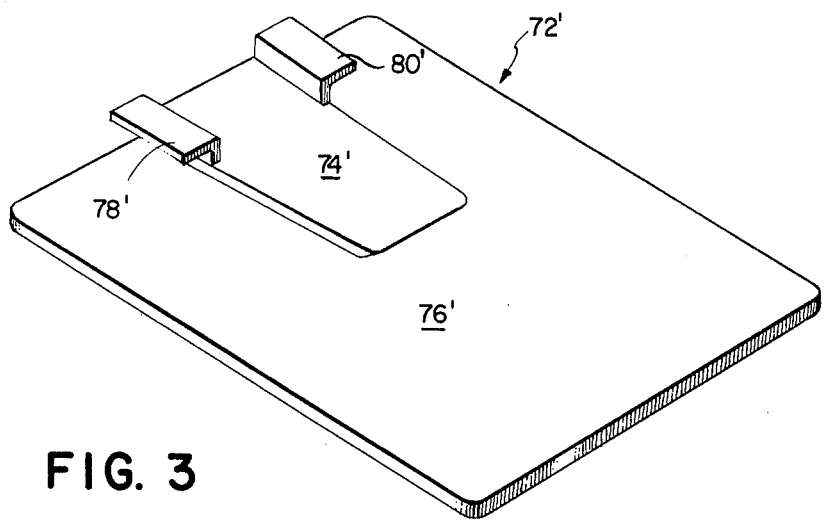
FIG. 3 is a perspective view of an alternative embodiment of a battery assembly.
Figure 7:
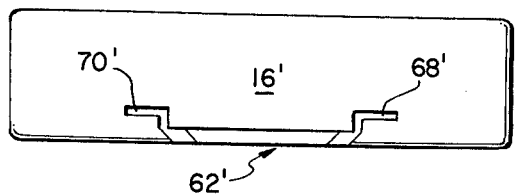
FIG. 7 is a view similar to FIG. 4 showing a rear wall of a camera adapted for use with the battery assembly of FIG. 3.
Figure 5:
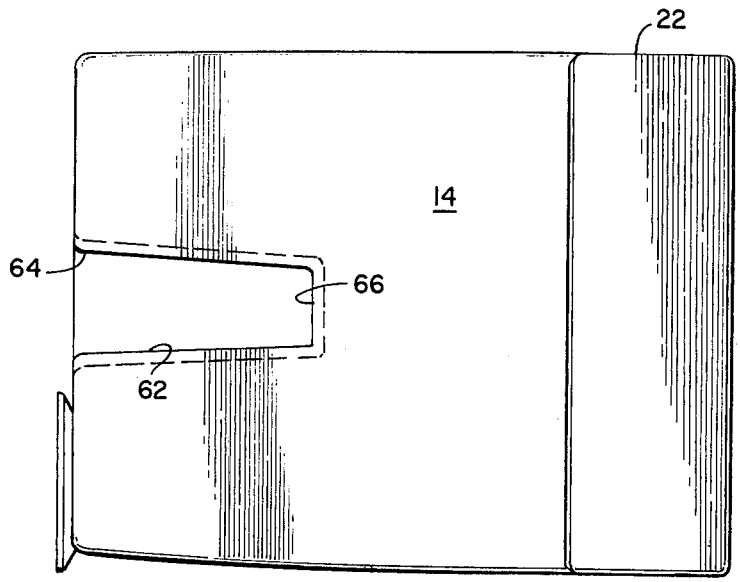
FIG. 5 is a bottom view of the camera shown in FIG. 1.
Figure 6:
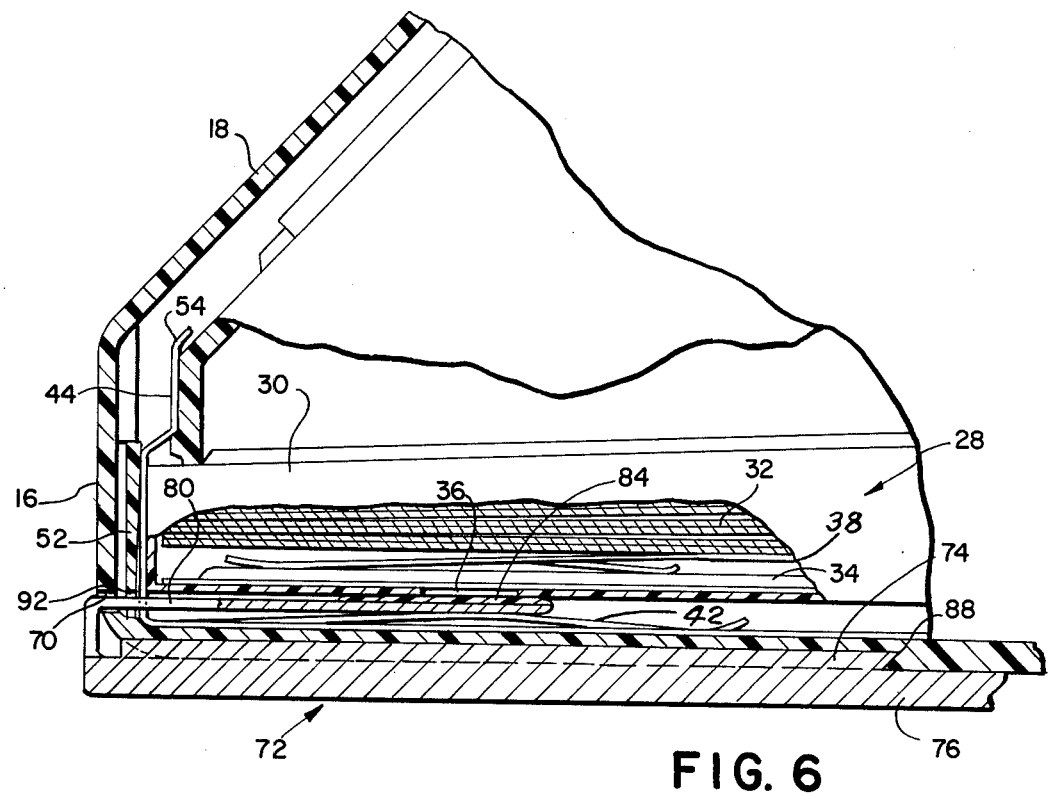
FIG. 6 is a side view, partly in section, of a rear portion of the camera shown in FIG. 1.
Figure 8:
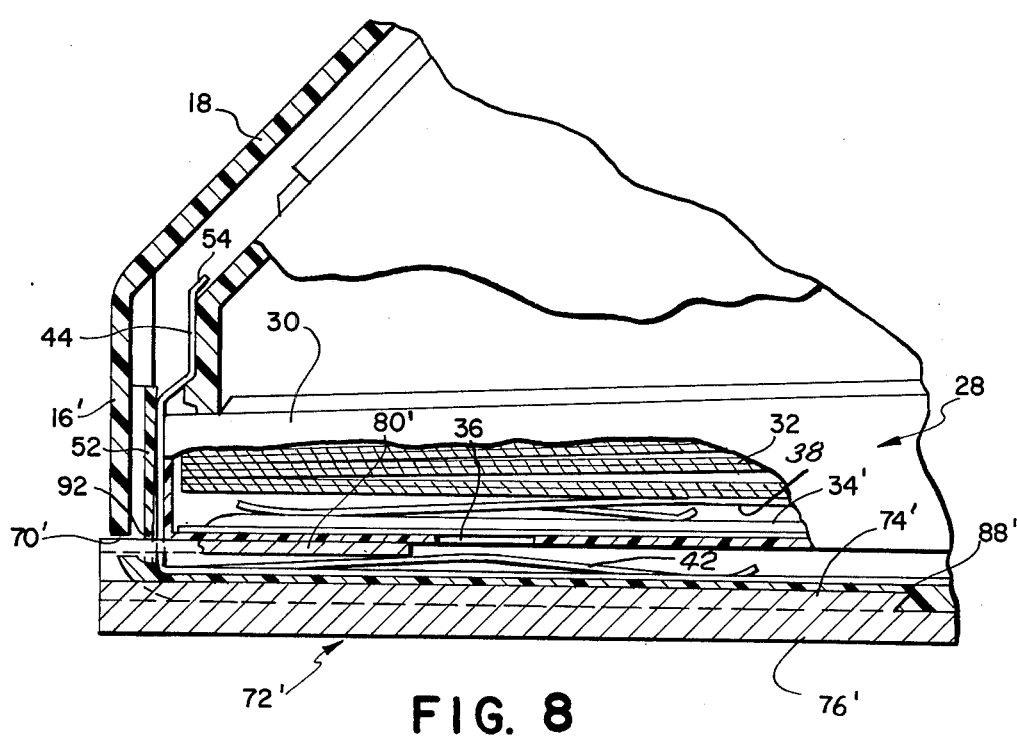
FIG. 8 is a view similar to FIG. 6 showing the battery assembly of FIG. 3 attached to a camera having a rear wall as shown in FIG. 7.

Reference is now made to FIGS. 3, 7 and 8 wherein is shown a modification of the invention. Specifically, FIG. 3 shows a battery assembly 72[1] having an attachment plate 74[1], a battery 76[1], and a pair of battery terminals 78[1] and 80[1] extending upwardly from the battery 76[1] and outwardly towards it sides. The battery assembly 72[1] is adapted for use with a camera 10 having a rear wall portion 16[1], as shown in FIG. 7. The rear wall portion 16[1] includes a pair of openings 68[1] and 70[1] which merge with a recess 62[1]. Recess 62[1] is identical to recess 62 and cooperates in the same manner as previously described to receive the attachment plate 74[1] only when the latter is properly orientated to insure correct electrical engagement between the battery terminals 78[1] and 80¹ and the camera contacts 40 and 42. As shown in FIG. 8, the terminals 78¹ and 80¹ need only extend into the camera a distance sufficient to cam the contacts out of engagement with the battery terminals 36.

While the invention has been described in conjunction with a film cassette containing a battery it should be obvious that the instant invention applies as well to a camera which may not have any provision for an internally mounted battery, i.e., the external battery of the instant invention would be the sole source of power; or the camera itself may have internal means, independent of a film cassette, for housing a battery in which the terminals of the above-disclosed battery assemblies would extend between the terminals of the internal battery and the contacts of the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera comprising:
  a housing;
  means defining a chamber for receiving a film cassette containing at least one film unit;
  means for performing a function associated with the processing of the film unit;
  electrically energizable means adapted to be operatively coupled to said performing means;
  an electrical circuit connected to said electrically energizable means, said circuit including a pair of contacts adapted for engagement with the terminals of a battery located within said camera to provide a source of energy for said electrically energizable means; and
  means for defining a recess in an exterior surface of said housing for releasably receiving at least a portion of a battery assembly to couple the battery assembly to said housing, said recess including means for guiding a pair of battery terminals on the battery assembly to a position within said housing whereat the battery terminals on the battery assembly engage and move said contacts out of engagement with the terminals of the battery located within the camera thereby providing a new source of energy for said electrically energizable means.

2. A camera as defined in claim 1 wherein said recess is located in a plane generally parallel with said exterior surface and includes an open end and a closed end, said open end having a greater width than said closed end to facilitate attachment of the battery assembly to said camera.

3. A camera as defined in claim 2 wherein said recess includes a rear wall and opposing side walls each said opposing wall including a portion tapering toward the other portion as said side walls terminate at said external surface of said housing.

4. A camera comprising:
  a housing;
  means defining a chamber for receiving a film cassette containing at least one film unit;
  means for performing a function associated with the processing of the film unit;
  electrically energizable means adapted to be operatively coupled to said performing means;
  an electrical circuit connected to said electrically energizable means, said circuit including a pair of contacts adapted for engagement with the terminals of a battery located within said camera to provide a source of energy for said electrically energizable means; and
  means in an exterior surface of said housing for receiving at least a portion of a battery assembly to couple the battery assembly to said housing, said receiving means including means for guiding a pair of battery terminals on the battery assembly to a position within said housing whereat the battery terminals on the battery assembly engage and move said contacts out of engagement with the terminals of the battery located within the camera thereby providing a new source of energy for said electrically energizable means.

* * * * *